United States Patent
Okamura et al.

(10) Patent No.: US 10,862,142 B2
(45) Date of Patent: Dec. 8, 2020

(54) FLOW RATE ADJUSTMENT STRUCTURE AND FLOW RATE ADJUSTMENT METHOD

(71) Applicant: HONDA MOTOR CO., LTD., Tokyo (JP)

(72) Inventors: Yuji Okamura, Wako (JP); Hideo Numata, Wako (JP); Makoto Hattori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 81 days.

(21) Appl. No.: 16/199,686

(22) Filed: Nov. 26, 2018

(65) Prior Publication Data

US 2019/0165390 A1    May 30, 2019

(30) Foreign Application Priority Data

Nov. 27, 2017  (JP) ................. 2017-226559

(51) Int. Cl.

| | |
|---|---|
| *F16K 31/06* | (2006.01) |
| *H01M 8/00* | (2016.01) |
| *H01M 8/04089* | (2016.01) |
| *F16F 15/00* | (2006.01) |
| *H01M 8/04082* | (2016.01) |
| *H01M 8/04746* | (2016.01) |

(Continued)

(52) U.S. Cl.
CPC ....... *H01M 8/04089* (2013.01); *F16F 15/002* (2013.01); *F16K 3/26* (2013.01); *F16K 31/0668* (2013.01); *F16K 31/0675* (2013.01); *F16K 37/0041* (2013.01); *H01M 8/04201* (2013.01); *H01M 8/04753* (2013.01); *H01M 2250/20* (2013.01)

(58) Field of Classification Search
CPC ...... F16F 15/002; F16K 3/26; F16K 37/0041; F16K 31/0668; F16K 31/0675; F16K 5/0407; F16K 5/10; F16K 5/0414
See application file for complete search history.

(56) References Cited

U.S. PATENT DOCUMENTS

| | | | | |
|---|---|---|---|---|
| 5,944,051 A | * | 8/1999 | Johnson ............. | A62C 37/50 137/559 |
| 8,757,205 B1 | * | 6/2014 | Trent ............... | F16K 47/045 137/601.16 |

(Continued)

FOREIGN PATENT DOCUMENTS

| | | |
|---|---|---|
| JP | 2003-194251 A | 7/2003 |
| JP | 2009-158250 A | 7/2009 |

(Continued)

OTHER PUBLICATIONS

Office Action dated Jul. 30, 2019 issued over the corresponding Japanese Patent Application No. 2017-226559 with the English translation thereof.

*Primary Examiner* — Kelsey E Cary
(74) *Attorney, Agent, or Firm* — Carrier Blackman & Associates, P.C.; Joseph P. Carrier; Anne G. Sabourin

(57) ABSTRACT

A flow rate adjustment structure includes: a fixed member including a fixed surface on which a fixed opening is formed; a movable member including a movable surface on which a movable opening is formed, and to be displaced relative to the fixed member; and an adjustment unit that variably adjusts an overlap area or an overlap frequency between the fixed opening and the movable opening by relatively displacing the movable surface along the fixed surface.

9 Claims, 16 Drawing Sheets

(51) Int. Cl.
*F16K 3/26* (2006.01)
*F16K 37/00* (2006.01)

(56) References Cited

U.S. PATENT DOCUMENTS

| | | | | |
|---|---|---|---|---|
| 2003/0168622 | A1* | 9/2003 | Jorgensen | F16K 3/34 |
| | | | | 251/206 |
| 2006/0175566 | A1* | 8/2006 | Albizuri | G01F 15/002 |
| | | | | 251/207 |
| 2010/0305508 | A1* | 12/2010 | Franks | A61M 5/1422 |
| | | | | 604/152 |
| 2012/0183875 | A1* | 7/2012 | Yumita | H01M 8/04228 |
| | | | | 429/434 |
| 2014/0034165 | A1* | 2/2014 | Alcaraz Sencianes | |
| | | | | F16K 15/188 |
| | | | | 137/614.2 |
| 2014/0134508 | A1* | 5/2014 | Ishikawa | H01M 8/04104 |
| | | | | 429/430 |
| 2016/0141672 | A1* | 5/2016 | Toida | H01M 8/04402 |
| | | | | 429/415 |
| 2017/0030483 | A1* | 2/2017 | Yeh | B67D 3/045 |
| 2017/0069922 | A1* | 3/2017 | Yamanaka | H01M 8/04253 |
| 2019/0148751 | A1* | 5/2019 | Kozuka | H01M 8/04738 |
| | | | | 429/434 |

FOREIGN PATENT DOCUMENTS

| | | |
|---|---|---|
| JP | 2012-219276 A | 11/2012 |
| JP | 2014-080634 A | 5/2014 |
| JP | 2015-075315 A | 4/2015 |

* cited by examiner

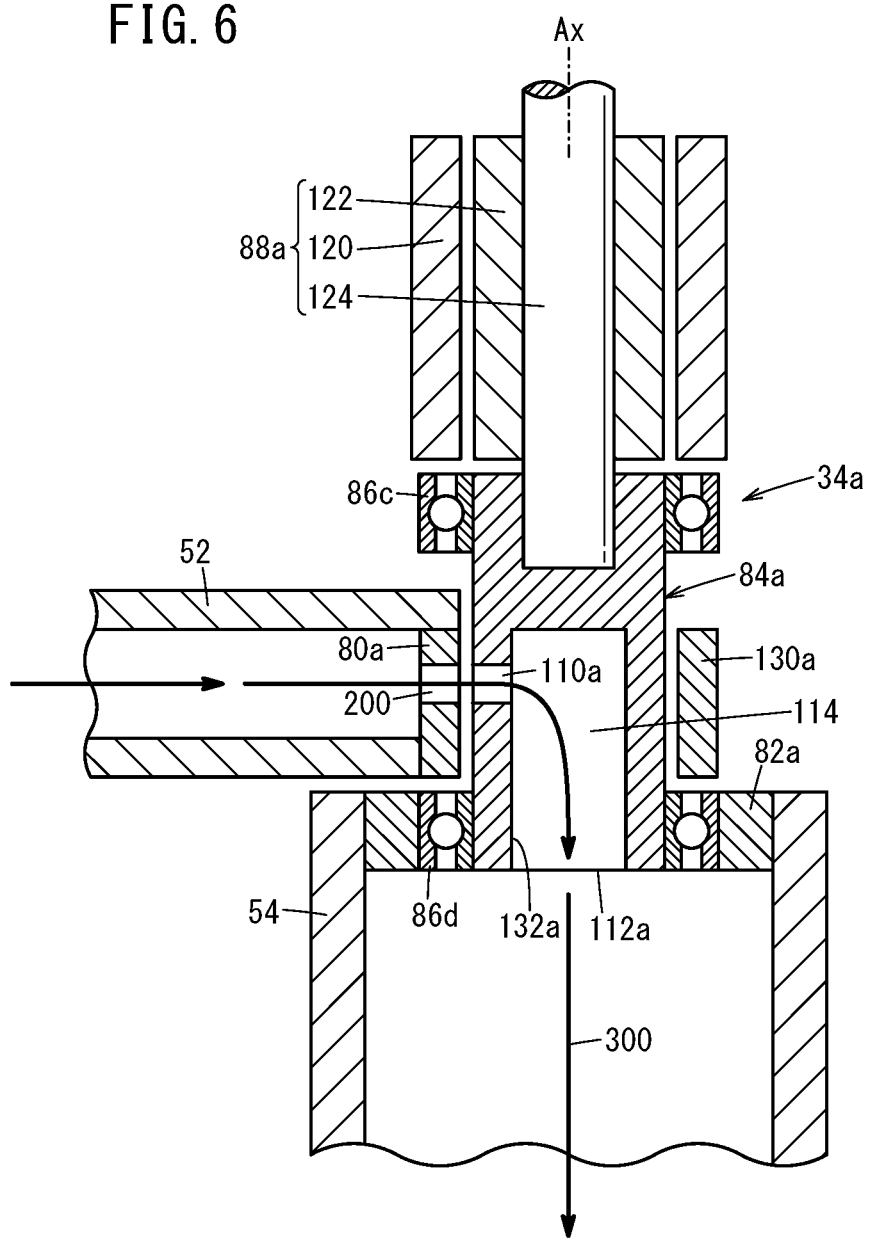

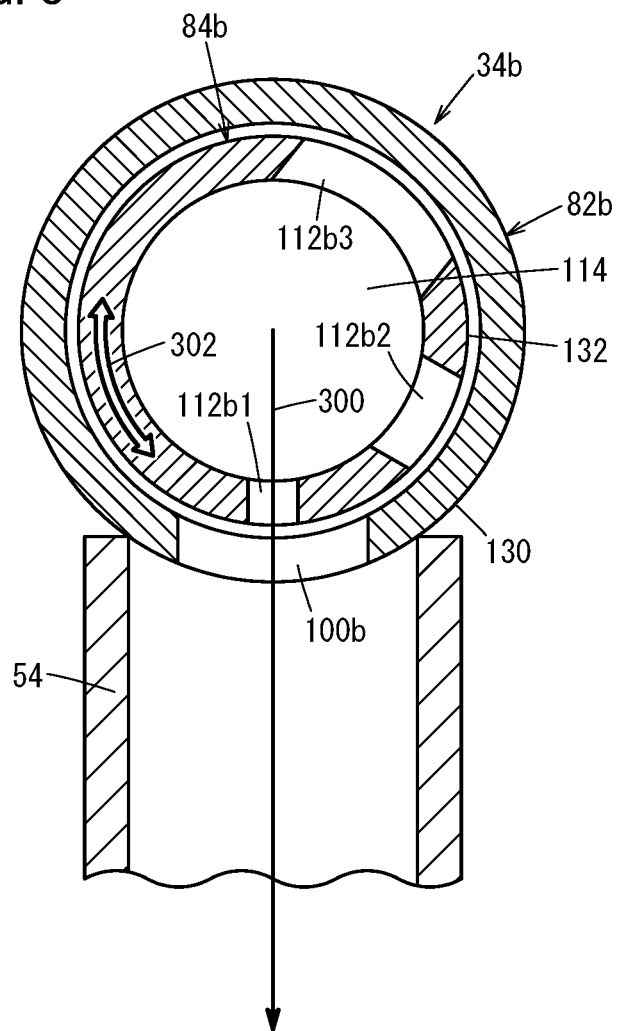

FLOW RATE ADJUSTMENT STRUCTURE AND FLOW RATE ADJUSTMENT METHOD

CROSS-REFERENCE TO RELATED APPLICATION

This application is based upon and claims the benefit of priority from Japanese Patent Application No. 2017-226559 filed on Nov. 27, 2017, the contents of which are incorporated herein by reference.

BACKGROUND OF THE INVENTION

Field of the Invention

The present invention relates to a flow rate adjustment structure and a flow rate adjustment method that adjust a flow rate of a fluid.

Description of the Related Art

In Japanese Laid-Open Patent Publication No. 2009-158250, an object is to provide a fuel cell system that can suppress vibration and noise due to an injector as much as possible ([0004], abstract). To achieve the object, the fuel cell system according to Japanese Laid-Open Patent Publication No. 2009-158250 (abstract) includes a hydrogen tank, a fuel cell to which a hydrogen gas from the hydrogen tank is supplied, and an injector 35. The injector 35 adjusts a gas pressure of the hydrogen gas on the basis of a requested pressure in accordance with a load request for the fuel cell, and supplies the adjusted hydrogen gas to the fuel cell. An upstream side of the injector 35 is provided with a regulator 34a that adjusts the gas pressure of the hydrogen gas from the hydrogen tank to the requested pressure when the maximum load in the fuel cell is requested.

A valve element 65 (FIG. 2) of the injector 35 is driven by power supply control for a solenoid 69 ([0024]). By turning on/off a pulsed excitation current to be supplied to the solenoid 69, an opening area of an internal passage 53 can be changed (two patterns: full-open/full-close). Then, by a control signal that is output from a control unit 4, a gas injection time and a gas injection timing of the injector 35 are controlled. Therefore, a flow rate and the pressure of the hydrogen gas are controlled with high accuracy ([0024]). One end of a spring 67 (FIG. 2) is inserted into a cylindrical part 62 of the valve element 65 and the other end thereof is engaged with a stopper 66 that is formed in a first passage part 56. Thus, the spring 67 brings the valve element 65 in contact with a valve seat 61 so as to block an internal passage 53 ([0023]).

SUMMARY OF THE INVENTION

As described above, in Japanese Laid-Open Patent Publication No. 2009-158250, the valve element 65 (FIG. 2) of the injector 35 is driven by the power supply control for the solenoid 69 ([0024]). By turning on/off the pulsed excitation current to be supplied to the solenoid 69, the valve element 65 of the injector 35 is displaced in a longitudinal direction. By this displacement, the opening area of the internal passage 53 can be changed (two patterns: full-open/full-close) ([0024]). In addition, if the power is not supplied to the solenoid 69, the valve element 65 is energized by the spring 67 and is in contact with the valve seat 61 so as to block the internal passage 53 ([0023]).

In the structure as described above, the valve element 65 approaches or separates from the valve seat 61 so that the hydrogen (fluid) pulsates. Therefore, in a hydrogen supply system, vibration noise occurs easily. In addition, when the valve element 65 is in contact with the valve seat 61 and the like, contact noise may occur. If the pressure of the hydrogen that passes the injector 35 is high, the vibration noise and the contact noise as above become loud, and a user (occupant in vehicle, for example) may feel uncomfortable.

The present invention has been made in consideration of the above problem, and an object is to provide a flow rate adjustment structure and a flow rate adjustment method that can improve a silence characteristic with a simple structure.

A flow rate adjustment structure according to the present invention adjusts a flow rate of a fluid, and includes: a fixed member including a fixed surface on which a fixed opening is formed; a movable member including a movable surface on which a movable opening is formed, and to be displaced relative to the fixed member; and an adjustment unit configured to variably adjust an overlap area or an overlap frequency between the fixed opening and the movable opening by relatively displacing the movable surface along the fixed surface.

According to the present invention, by relatively displacing the movable surface along the fixed surface, the overlap area or the overlap frequency between the fixed opening and the movable opening is adjusted variably. Thus, the flow rate of the fluid is adjusted. Therefore, compared with the structure disclosed in Japanese Laid-Open Patent Publication No. 2009-158250 in which the valve element approaches and separates from the valve seat repeatedly, the noise or the vibration can be suppressed.

The movable member may rotate relative to the fixed member. Therefore, it becomes easy to relatively displace the movable surface along the fixed surface with the simple structure. In addition, when a general-purpose component such as a motor moves the movable member, the cost can be reduced.

The fixed member and the movable member may have a concentric cylindrical shape. In addition, the adjustment unit may vary the overlap area or the overlap frequency between the fixed opening and the movable opening by rotating the movable member. Thus, even when the movable surface is displaced relatively along the fixed surface, a distance between the movable surface and the fixed surface does not change. Therefore, it becomes easy to suppress the noise or the vibration from the flow rate adjustment structure.

The adjustment unit may vary the overlap area or the overlap frequency between the fixed opening and the movable opening by continuously rotating the movable member in one direction. Therefore, compared with a case where the movable member is rotated in normal and reverse directions alternately, the durability of the movable member, the motor that rotates the movable member, and the like can be improved.

One of the fixed opening and the movable opening may include a plurality of openings with different opening areas. Therefore, by selecting any one of the openings in accordance with the requested flow rate, a flow rate adjustment range of the fluid can be set widely.

The other of the fixed opening and the movable opening may have an opening area that is equal to the largest opening area of the plurality of openings, and when both face each other, outlines thereof may coincide with each other. In this case, when the fixed opening and the movable opening face each other, the fluid can pass efficiently.

One of the fixed opening and the movable opening may have a shape of a triangle. In addition, the other may be able to be displaced in a direction of a base length of the triangle and in a direction of a height of the triangle. Therefore, the other opening to be displaced in the direction of the base length is displaced in the direction of the height of the triangle in accordance with the requested flow rate so that the flow rate of the fluid can be adjusted. Thus, without increasing the number of the components excessively, the flow rate adjustment range can be set widely.

The flow rate adjustment structure may include a controller configured to, after the movable member is stopped, determine whether an index temperature regarding an outside air temperature or a peripheral temperature of the movable member becomes less than or equal to a temperature threshold that is equal to or near zero degrees. In addition, if it is determined that the index temperature becomes less than or equal to the temperature threshold, the controller may vibrate or reciprocate the movable member through the adjustment unit in a state where the fixed opening and the movable opening are relatively displaced so that the fixed opening and the movable opening do not overlap with each other. Therefore, ice by the slight degree of freeze of dew condensation water and the like around the movable member can be crushed. Thus, the workability at an extremely low temperature can be enhanced.

A flow rate adjustment method for adjusting a flow rate of a fluid according to the present invention includes: disposing a fixed member including a fixed surface on which a fixed opening is formed and a movable member including a movable surface on which a movable opening is formed and to be displaced relative to the fixed member so that the fixed member and the movable member face each other; and adjusting variably an overlap area or an overlap frequency between the fixed opening and the movable opening by relatively displacing the movable surface along the fixed surface.

A flow rate adjustment structure according to the present invention adjusts a flow rate of a fluid, and includes: a first guide member including a first passage through which the fluid passes and a first surface on which a first opening that discharges the fluid that has passed the first passage is formed; a second guide member including a second surface on which a second opening that passes the fluid that is discharged from the first opening is formed; and an adjustment unit configured to variably adjust an overlap area or an overlap frequency between the first opening and the second opening by relatively displacing one of the first surface and the second surface along the other.

In the present invention, by relatively displacing one of the first surface and the second surface along the other, the overlap area or the overlap frequency between the first opening and the second opening is variably adjusted so that the flow rate of the fluid is adjusted. Therefore, compared with the structure disclosed in Japanese Laid-Open Patent Publication No. 2009-158250 in which the valve element approaches and separates from the valve seat repeatedly, the noise or the vibration can be suppressed.

By the present invention, the silence characteristic can be improved with the simple structure.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 6 illustrates a schematic structure of an injector according to a second embodiment;

FIG. 8 is a cross-sectional view in the third embodiment corresponding to FIG. 3 in the first embodiment;

DESCRIPTION OF THE PREFERRED EMBODIMENTS

A. First Embodiment

<A-1. Structure>
[A-1-1. Overall Structure]

Figure 1:
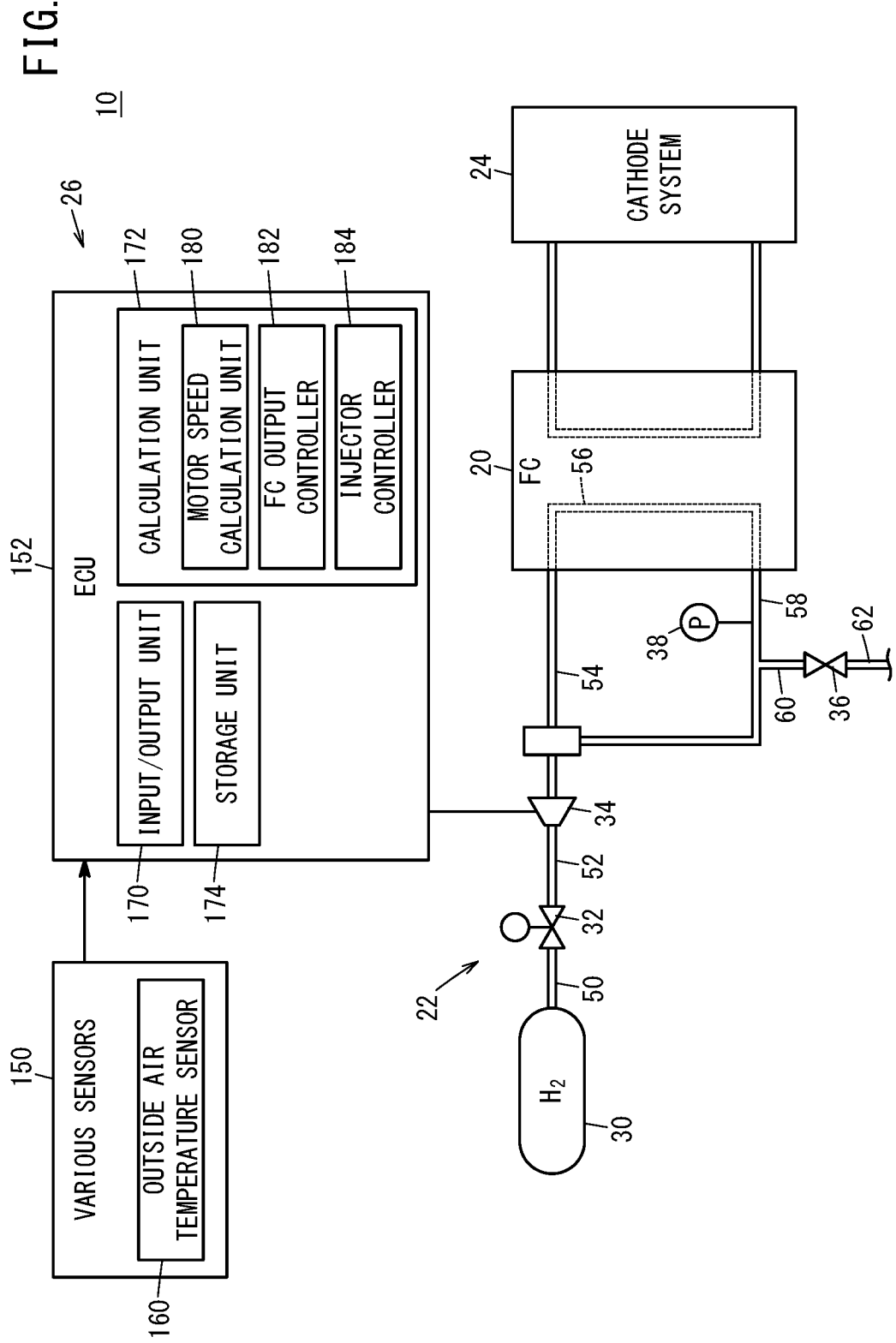
FIG. 1 is a block diagram of a fuel cell system including an injector according to a first embodiment of the present invention.
Figure 2:
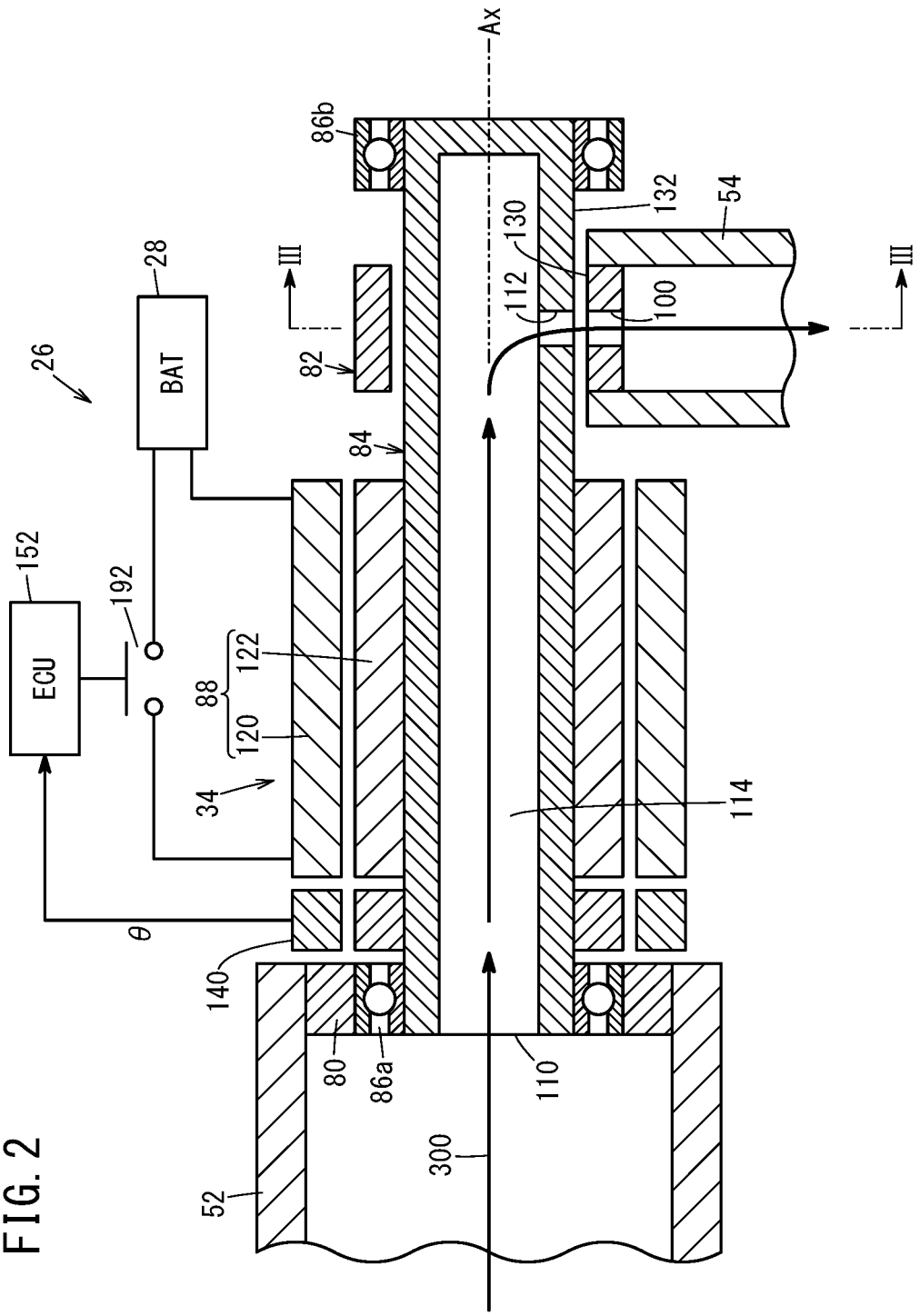
FIG. 2 is a schematic diagram of a structure of the injector according to the first embodiment and a control system that controls the injector.

FIG. 1 is a block diagram of a fuel cell system 10 (hereinafter, also referred to as "FC system 10") including an injector 34 as a flow rate adjustment structure according to a first embodiment of the present invention. FIG. 2 is a schematic diagram of a structure of the injector 34 according to the first embodiment and a control system 26 that controls the injector 34. An arrow 300 in FIG. 2 and FIG. 3 described below indicates a flow of a hydrogen gas. The FC system 10 according to the first embodiment is used for a vehicle and may also be used for other purposes. The FC system 10 includes a fuel cell stack 20 (hereinafter, referred to as "FC stack 20" or "FC 20"), an anode system 22, a cathode system 24, the control system 26, and a battery 28 (FIG. 2).

The FC stack 20 includes, for example, a structure in which fuel cells are stacked. In each fuel cell, a solid polymer electrolyte membrane is held between an anode electrode and a cathode electrode from both sides. The anode system 22 supplies the hydrogen gas to the FC 20. The cathode system 24 supplies an oxygen containing gas to the FC 20. The control system 26 controls the FC 20, the anode system 22, and the cathode system 24.

A structure of the cathode system 24 may be similar to that in Japanese Laid-Open Patent Publication No. 2012-219276 or Japanese Laid-Open Patent Publication No. 2014-080634, for example.

[A-1-2. Anode System 22]

(A-1-2-1. Outline)

As illustrated in FIG. 1, the anode system 22 includes a hydrogen tank 30, a regulator 32, the injector 34, a purge valve 36, and a pressure sensor 38. The hydrogen tank 30 stores the hydrogen as a fuel gas, and is connected to an entrance of an anode passage 56 through a pipe 50, the regulator 32, a pipe 52, the injector 34, and a pipe 54. Thus, the hydrogen in the hydrogen tank 30 can be supplied to the anode passage 56 through the pipe 50 and the like. Note that the pipe 50 includes a shutoff valve (not shown), and when the FC stack 20 generates power, the shutoff valve is opened by an electronic control unit 152 of the control system 26. The regulator 32 adjusts a pressure of the hydrogen that is introduced to a predetermined value.

The injector 34 injects from a nozzle the hydrogen coming from the hydrogen tank 30 to generate a negative pressure. By this negative pressure, an anode off-gas in a pipe 58 is sucked. A specific structure of the injector 34 will be described below with reference to FIG. 2.

The anode off-gas discharged from the anode passage 56 is introduced to the pipe 54 again through the pipe 58, so that the anode off-gas (hydrogen) circulates. Note that the anode off-gas includes steam and the hydrogen not consumed in electrode reaction at the anode. In addition, the pipe 58 is provided with a gas-liquid separator (not shown) that separates and collects moisture {condensed water (liquid), steam (gas)} included in the anode off-gas.

Part of the pipe 58 is connected to a dilution box (not shown) through a pipe 60, the purge valve 36, and a pipe 62. However, the dilution box may be omitted. If it is determined that the power generation by the FC stack 20 is not stable, the purge valve 36 is opened for a predetermined time on the basis of an instruction from the control system 26. The dilution box dilutes the hydrogen in the anode off-gas coming from the purge valve 36 with a cathode off-gas.

The pressure sensor 38 detects a pressure P in the anode system 22 (here, pipe 58), and transmits the pressure P to the control system 26. The pressure sensor 38 may be provided at other positions.

(A-1-2-2. Injector 34)

(A-1-2-2-1. Outline)

Figure 3:
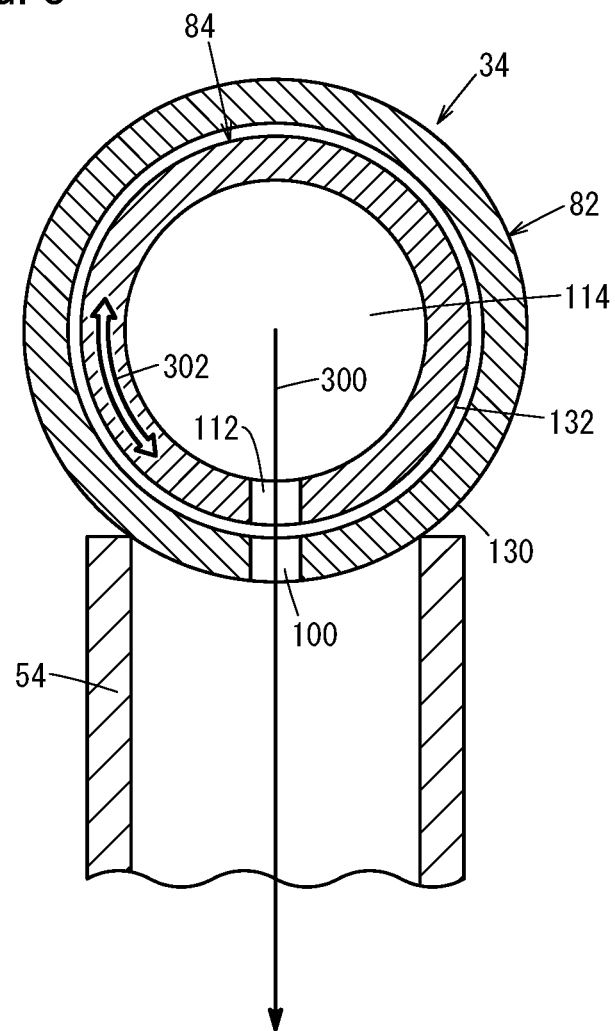
FIG. 3 is a cross-sectional view taken along line III-III in FIG. 2.

FIG. 3 is a cross-sectional view taken along line III-III in FIG. 2. Note that some members are omitted in FIG. 3. As described above, the arrow 300 in FIG. 3 indicates the flow of the hydrogen gas. In addition, an arrow 302 in FIG. 3 indicates a rotation direction of a movable member 84. The injector 34 adjusts a flow rate of the hydrogen (fluid) to be supplied from the hydrogen tank 30 side to the FC 20 side. The negative pressure is generated in the pipe 58 at a confluence point with the pipe 54 by injecting from the nozzle the hydrogen coming from the hydrogen tank 30. With this negative pressure, the anode off-gas in the pipe 58 is sucked.

As illustrated in FIG. 2, the injector 34 includes a first fixed member 80, a second fixed member 82, the movable member 84, bearings 86a, 86b, and an injector motor 88. The movable member 84 is rotatably supported by the bearings 86a, 86b.

(A-1-2-2-2. First Fixed Member 80 and Second Fixed Member 82)

The first fixed member 80 rotatably supports the movable member 84 through the bearing 86a. The first fixed member 80 is connected to the pipe 52 located on the hydrogen tank 30 side. The second fixed member 82 (second guide member) is fixed to the pipe 54 located on the FC 20 side. The first fixed member 80 and the second fixed member 82 have a cylindrical shape (regarding second fixed member 82, see also FIG. 3).

The first fixed member 80 has a cylindrical shape and the bearing 86a is fixed to the inside of the first fixed member 80. Inside the bearing 86a, the movable member 84 is disposed being rotatable due to the bearing 86a (FIG. 2).

The second fixed member 82 has a cylindrical shape and the movable member 84 penetrates the inside of the second fixed member 82 (FIG. 2 and FIG. 3). In addition, the second fixed member 82 is provided with an FC side opening 100 (FIG. 2 and FIG. 3). The FC side opening 100 opens in a direction perpendicular to a rotation axis Ax (FIG. 2) of the movable member 84.

(A-1-2-2-3. Movable Member 84)

The movable member 84 (first guide member) is displaced relative to the first fixed member 80 and the second fixed member 82 by driving force from the injector motor 88. More specifically, the movable member 84 rotates relative to the first fixed member 80 and the second fixed member 82 by the driving force from the injector motor 88. The movable member 84 includes a first movable opening 110 on the first fixed member 80 side, and a second movable opening 112 on the second fixed member 82 side. The movable member 84 has a cylindrical shape basically, and the center thereof coincides with the center of the first fixed member 80 and the second fixed member 82 (FIG. 3).

The first movable opening 110 opens in a direction of the rotation axis Ax of the movable member 84. The second movable opening 112 opens in the direction perpendicular to the rotation axis Ax of the movable member 84. Thus, the hydrogen gas that has entered an internal space 114 (first passage) of the movable member 84 from the first movable opening 110 is discharged through the second movable opening 112.

In FIG. 2 and FIG. 3, the space between the second fixed member 82 and the movable member 84 is relatively large in order to distinguish between the second fixed member 82 and the movable member 84 easily. Note that actually, a side surface of the second fixed member 82 and a side surface of the movable member 84 are in a contact state or in a nearly contact state (this point similarly applies to second to sixth embodiments).

(A-1-2-2-4. Bearings 86a, 86b)

The bearings 86a, 86b are ball bearings and support the movable member 84 rotatably.

(A-1-2-2-5. Injector Motor 88)

The injector motor 88 (adjustment unit) is a direct current type and includes a stator 120 and a rotor 122 as illustrated in FIG. 2. The rotor 122 is fixed to the movable member 84.

The motor 88 operates based on the instruction from the control system 26 (particularly, from electronic control unit 152). In other words, the injector motor 88 (hereinafter, also referred to as "motor 88") rotates the movable member 84 through the rotor 122 so that a surface 132 (hereinafter, also referred to as "movable surface 132") of the movable member 84 is relatively displaced along a surface 130 (hereinafter, also referred to as "fixed surface 130") of the second fixed member 82. Thus, an overlap area Ao or an overlap frequency Fo between the FC side opening 100 and the second movable opening 112 is adjusted variably.

The motor 88 is provided with a resolver 140 that detects a rotation angle θ of the motor 88 (hereinafter, also referred to as "motor angle θ").

[A-1-3. Control System 26]

(A-1-3-1. Outline of Control System 26)

As illustrated in FIG. 1, the control system 26 includes various sensors 150 and the electronic control unit 152 (hereinafter, referred to as "ECU 152").

(A-1-3-2. Various Sensors 150)

The various sensors 150 detect various sensor values that are necessary for control performed by the ECU 152, and output the various sensor values to the ECU 152. The various sensors 150 include an outside air temperature sensor 160. The outside air temperature sensor 160 detects an outside air temperature T [° C.] of the vehicle and outputs the outside air temperature T to the ECU 152. The various sensors 150 may include the pressure sensor 38 and the resolver 140.

(A-1-3-3. ECU 152)

(A-1-3-3-1. Outline of ECU 152)

The ECU 152 is a computer that controls the entire FC system 10. As illustrated in FIG. 1, the ECU 152 includes an input/output unit 170, a calculation unit 172, and a storage unit 174.

(A-1-3-3-2. Input/Output Unit 170)

The input/output unit 170 performs input into and output from devices other than the ECU 152 (various sensors 150 and the like). The input/output unit 170 includes an A/D conversion circuit (not shown) which converts an input analog signal to a digital signal.

(A-1-3-3-3. Calculation Unit 172)

The calculation unit 172 includes a central processing unit (CPU), for example. The calculation unit 172 performs calculation on the basis of signals from the various sensors 150 and the like. Then, the calculation unit 172 generates a signal for the anode system 22 and the cathode system 24 on the basis of the calculation result.

As illustrated in FIG. 1, the calculation unit 172 includes a motor speed calculation unit 180, an FC output controller 182, and an injector controller 184. These units are realized by executing programs stored in the storage unit 174. The programs may be provided from an outer device through a communication device that is not shown. Part of the programs may be replaced by hardware (circuit component).

The FC output controller 182 performs FC output control that controls output of the FC 20. The FC output control is performed based on an instruction from an integrated control electronic control unit (hereinafter, also referred to as "integrated control ECU" and not shown) that controls the driving force of the entire vehicle.

The injector controller 184 performs injector motor control that controls the injector motor 88 on the basis of an instruction from the FC output controller 182. Description will be made of the injector motor control in detail with reference to FIG. 4.

(A-1-3-3-4. Storage Unit 174)

The storage unit 174 stores the programs and data to be used by the calculation unit 172. The storage unit 174 includes, for example, a random access memory (hereinafter, referred to as "RAM"). AS the RAM, a volatile memory such as a register and a nonvolatile memory such as a flash memory can be used. The storage unit 174 may include, in addition to the RAM, a read only memory (ROM) and/or a solid state drive (SSD).

<A-2. Various Controls in First Embodiment>

[A-2-1. FC Output Control]

As described above, the output of the FC 20 is controlled in the FC output control. The FC output control is performed based on the instruction from the integrated control ECU that controls the driving force of the entire vehicle. The integrated control ECU generates the instruction for the ECU 152 on the basis of an operation of an accelerator pedal (not shown) and the like.

When the output (or the amount of power generated) of the FC 20 is increased based on the instruction from the integrated control ECU, the FC output controller 182 instructs the injector controller 184 to increase a discharge flow F [NLM] of the hydrogen gas.

[A-2-2. Injector Motor Control]

Figure 4:
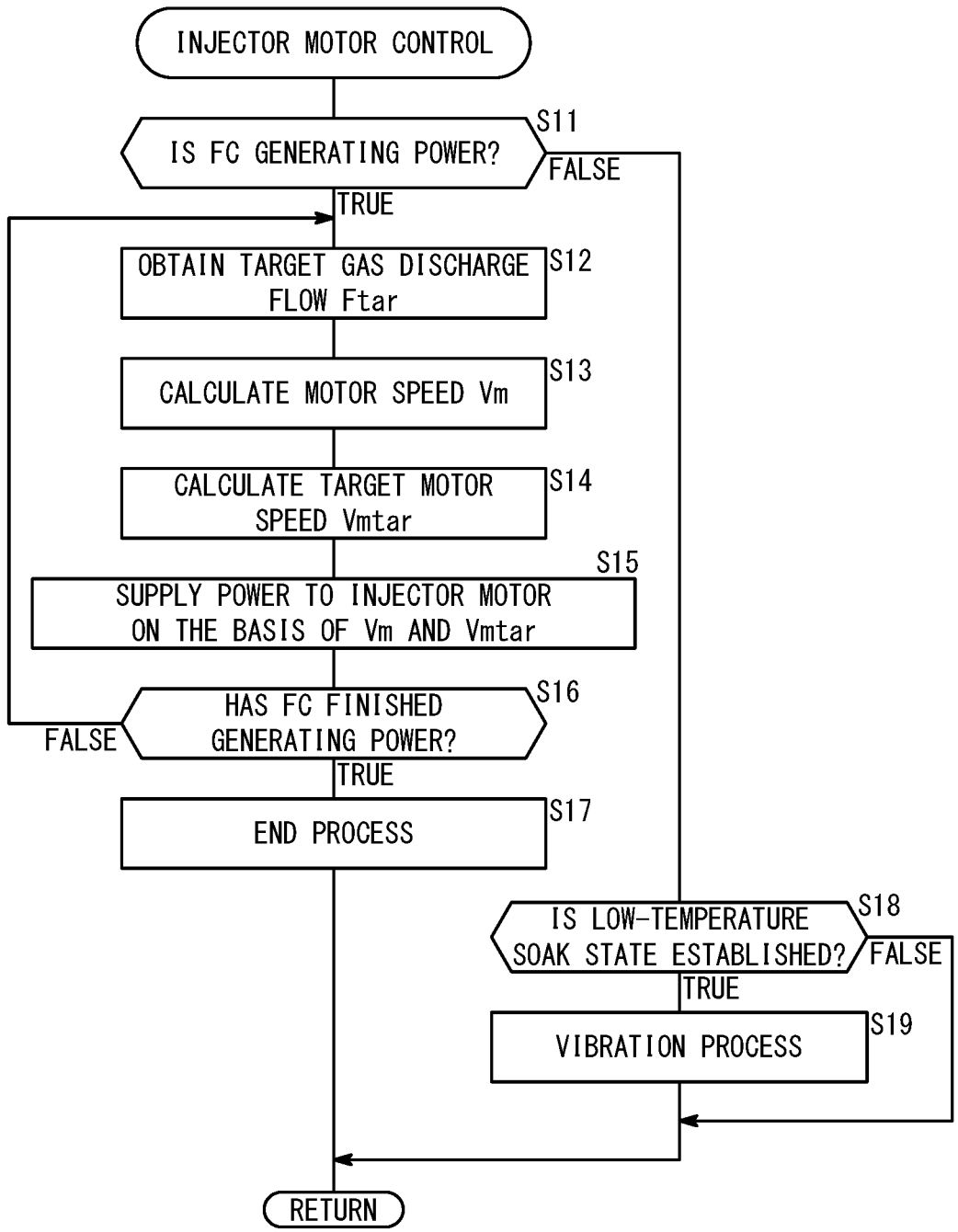
FIG. 4 is a flowchart of injector motor control in the first embodiment.

FIG. 4 is a flowchart of the injector motor control in the first embodiment. In the injector motor control, output of the injector motor 88 is controlled based on an instruction from the FC output controller 182.

In step S11 in FIG. 4, the ECU 152 (injector controller 184) determines whether the FC 20 is generating the power. If the FC 20 is generating the power (S11: TRUE), the process advances to step S12.

In step S12, the injector controller 184 obtains a target gas discharge flow Ftar from the FC output controller 182. The target gas discharge flow Ftar is a target value [NLM] of the discharge flow F of the hydrogen gas from the injector 34.

In step S13, the injector controller 184 calculates a speed Vm [rpm] of the motor 88 (that is, motor rotation number per unit time) on the basis of the motor angle θ detected by the resolver 140. The speed Vm is hereinafter also referred to as motor speed Vm or rotation speed Vm.

In step S14, the injector controller 184 calculates a target value of the motor speed Vm (hereinafter, also referred to as "target motor speed Vmtar") on the basis of the target gas discharge flow Ftar.

As described above, in the first embodiment, when the FC side opening 100 of the second fixed member 82 and the second movable opening 112 of the movable member 84 overlap with each other, the hydrogen is injected, and when the openings 100, 112 do not overlap with each other, the hydrogen is not injected.

In addition, in the first embodiment, when the hydrogen is injected, the injector motor 88 is kept rotating in one direction. Thus, an overlap state and a non-overlap state between the FC side opening 100 and the second movable opening 112 are repeated alternately.

Figure 5:
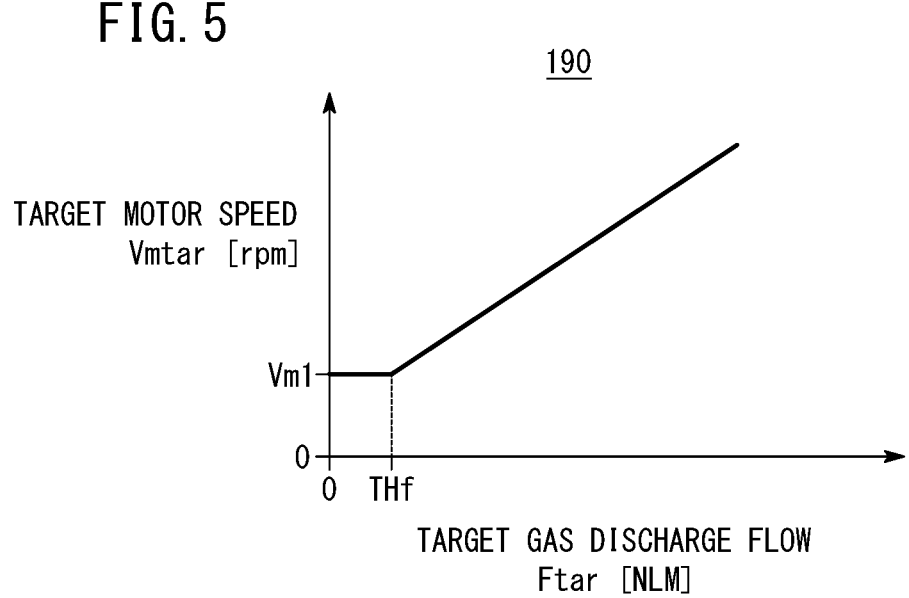
FIG. 5 shows a map that expresses a relation between a target gas discharge flow and a target motor speed in the first embodiment.

FIG. 5 shows a map 190 that expresses a relation between the target gas discharge flow Ftar and the target motor speed Vmtar in the first embodiment. As illustrated in FIG. 5, as the target gas discharge flow Ftar increases, the target motor speed Vmtar is increased. This is because, when the FC side opening 100 and the second movable opening 112 overlap with each other, the hydrogen is injected to the FC 20 side; thus, the pressure of the hydrogen in the injector 34 decreases temporarily. That is to say, when a time for which the FC side opening 100 and the second movable opening 112 overlap with each other is short, a time for which the pressure of the hydrogen decreases becomes short. Thus, until the FC side opening 100 and the second movable opening 112 overlap with each other, the pressure increases. Therefore, it is easy to keep the pressure of the hydrogen in the injector 34 high; as a result, the discharge flow F of the hydrogen gas increases.

In FIG. 5, when the target gas discharge flow Ftar is less than or equal to THf, the target motor speed Vmtar is constant at Vm1. This is because, when the motor speed Vm becomes low so that the time for which the FC side opening 100 and the second movable opening 112 overlap with each other becomes long extremely, the hydrogen is discharged excessively; therefore, this motor speed Vm is not used as the target motor speed Vmtar.

In step S15 in FIG. 4, the injector controller 184 supplies the power to the injector motor 88 on the basis of the motor speed Vm and the target motor speed Vmtar. That is to say, in order to make the motor speed Vm coincide with the target motor speed Vmtar, high and low levels of a driving signal for a switch 192 (FIG. 2) are switched.

In step S16, the injector controller 184 determines whether the FC 20 has finished generating the power. If the FC 20 has not finished generating the power (S16: FALSE), the process returns to step S12. If the FC 20 has finished generating the power (S16: TRUE), the process advances to step S17.

In step S17, the injector controller 184 performs an end process that stops the movable member 84 in a predetermined range. As described with reference to FIG. 5, when the motor speed Vm is less than or equal to Vm1, the discharge flow F of the hydrogen gas becomes too much. In light of the excessive flow, a stop position of the movable member 84 is restricted so as to prevent the FC side opening 100 and the second movable opening 112 from overlapping with each other in a state where the motor speed Vm is less than or equal to Vm1. In other words, a runway section for a time period until the FC side opening 100 and the second movable opening 112 overlap with each other is provided for the movable member 84. Thus, in a case where the injector motor 88 is newly started, it is ensured, when the FC side opening 100 and the second movable opening 112 are newly overlapped, that the motor speed Vm is more than or equal to Vm1. After a predetermined time from step S17, the process returns to step S11.

The process returns to step S11 in FIG. 4, and if the FC 20 is not generating the power (S11: FALSE), the process advances to step S18. In step S18, the injector controller 184 determines whether a low-temperature soak state is established. The low-temperature soak state is a state where the outside temperature T becomes less than or equal to a temperature threshold THt for the first time when or after the FC 20 is stopped. The temperature threshold THt is equal to or near zero degrees Celsius at which water is frozen. Note that for example, from the viewpoint of determining whether the freezing of dew condensation water and the like around the movable member 84 occurs, the low-temperature soak state may be determined using an index temperature other than the outside temperature T. As the index temperature, for example, a peripheral temperature of the movable member 84 detected by a temperature sensor provided in or around the injector 34 can be used.

If the low-temperature soak state is established (S18: TRUE), the process advances to step S19. If the low-temperature soak state is not established (S18: FALSE), the current injector motor control ends and after a predetermined time has passed, the process returns to step S11.

In step S19, the injector controller 184 performs a vibration process where the injector motor 88 is vibrated (or reciprocated) in a state where the FC side opening 100 and the second movable opening 112 do not overlap with each other. When the injector motor 88 is vibrated in the low-temperature soak state, ice formed around the injector motor 88 by loosely frozen dew condensation water and the like can be crushed. Thus, the workability at an extremely low temperature can be enhanced.

<A-3. Effect of First Embodiment>

As described above, in the first embodiment, by relatively displacing the movable surface 132 (first surface) of the movable member 84 along the fixed surface 130 (second surface) of the second fixed member 82, the overlap area Ao or the overlap frequency Fo between the FC side opening 100 (fixed opening, second opening) and the second movable opening 112 (movable opening, first opening) is adjusted variably. Thus, the flow rate of the hydrogen (fluid) is adjusted (FIG. 2, FIG. 3, and S15 in FIG. 4). Therefore, compared with the structure disclosed in Japanese Laid-Open Patent Publication No. 2009-158250 in which the valve element approaches and separates from the valve seat repeatedly, the noise or the vibration can be suppressed.

In the first embodiment, the movable member 84 rotates relative to the first fixed member 80 and the second fixed member 82 (FIG. 2 and FIG. 3). Therefore, it becomes easy to relatively displace the movable surface 132 of the movable member 84 along the fixed surface 130 of the second fixed member 82 with the simple structure. In addition, when a general-purpose component such as the motor 88 moves the movable member 84, the cost can be reduced.

In the first embodiment, the first fixed member 80, the second fixed member 82, and the movable member 84 have a concentric cylindrical shape (FIG. 2 and FIG. 3). In addition, the injector motor 88 (adjustment unit), by means of the rotation of the movable member 84, changes the overlap area Ao or the overlap frequency Fo between the FC side opening 100 (fixed opening) and the second movable opening 112 (movable opening) (FIG. 2, FIG. 3, S15 in FIG. 4). Thus, even when the movable surface 132 is relatively displaced along the fixed surface 130, a distance between the movable surface 132 and the fixed surface 130 does not change. Therefore, it becomes easy to suppress the noise or the vibration from the injector 34 (flow rate adjustment structure).

In the first embodiment, the injector motor 88 (adjustment unit) varies the overlap area Ao or the overlap frequency Fo between the FC side opening 100 (fixed opening) and the second movable opening 112 (movable opening) by continuously rotating the movable member 84 in one direction (S15 in FIG. 4). Therefore, compared with a case where the movable member 84 is rotated in normal and reverse directions alternately, the durability of the movable member 84, the injector motor 88 that rotates the movable member 84, and the like can be improved.

In the first embodiment, when the FC 20 is not generating the power (S11: FALSE in FIG. 4), that is, after the first guide member 84 (movable member) is stopped, the ECU 152 (controller) determines whether the outside air temperature T (index temperature) becomes less than or equal to the temperature threshold THt that is equal to or near zero degrees Celsius (S18). If it is determined that the outside air temperature T becomes less than or equal to the temperature threshold THt (S18: TRUE), the ECU 152 vibrates or reciprocates the movable member 84 through the injector motor 88 (adjustment unit) in the state where the FC side opening 100 (fixed opening) and the second movable opening 112 (movable opening) are relatively displaced so that the FC side opening 100 (fixed opening) and the second movable opening 112 (movable opening) do not overlap with each other (S19). Therefore, the ice formed around the movable member 84 by loosely frozen dew condensation water and the like can be crushed. Thus, the workability at extremely low temperatures can be enhanced.

B. Second Embodiment

<B-1. Structure (Difference from First Embodiment)>

FIG. 6 illustrates a schematic structure of an injector 34a according to a second embodiment. A structure in the second embodiment is similar to that in the first embodiment basically. The same reference symbol hereinafter denotes similar components and detailed description thereof is omitted.

In the first embodiment, the first fixed member 80 and the second fixed member 82 are disposed so that the first fixed member 80 and the second fixed member 82 are arranged in the direction of the rotation axis Ax (or longitudinal direction). The hydrogen passes between the first fixed member 80 and the second fixed member 82 (FIG. 2, etc.). In other words, the hydrogen passes through the inside of the injector motor 88. On the other hand, in the second embodiment, a first fixed member 80a and a second fixed member 82a are disposed on only one side of an injector motor 88a.

A movable member 84a is fixed to a rotation shaft 124 of the motor 88a, and is rotatably supported by bearings 86c, 86d. The first fixed member 80a is disposed on a side of the movable member 84a, and the second fixed member 82a is disposed along the direction of the rotation axis Ax (or longitudinal direction) of the movable member 84a. Therefore, the hydrogen does not pass the inside of the motor 88a.

The first fixed member 80a is connected to the pipe 52. A fixed opening 200 is formed on a surface 130a (fixed surface 130a) of the first fixed member 80a. Furthermore, a first movable opening 110a is formed on a surface 132a (movable surface 132a) of the movable member 84a. The discharge flow F of the hydrogen gas is adjusted in accordance with a relation between a rotation phase of the first movable opening 110a and the fixed opening 200. In this point, the second embodiment is similar to the first embodiment. The movable member 84a includes a second movable opening 112a that is disposed on a side opposite to the first movable opening 110a.

The second fixed member 82a is connected to the pipe 54. Therefore, the hydrogen that has entered from the first fixed member 80a to the internal space 114 of the movable member 84a is guided to the pipe 54 through the second fixed member 82a.

<B-2. Various Controls in Second Embodiment>

The FC output control and the injector motor control in the second embodiment are similar to those in the first embodiment.

<B-3. Effect of Second Embodiment>

In the second embodiment as described above, in addition to or instead of the effect of the first embodiment, the following effect can be obtained.

In the second embodiment, the first fixed member 80a is disposed on the side of the movable member 84a that is fixed to the rotation shaft 124 of the motor 88a. The movable member 84a includes the first movable opening 110a on a side opposite to the motor 88a. The hydrogen (fluid) is guided from the fixed opening 200 of the first fixed member 80a to the internal space 114 of the movable member 84a through the first movable opening 110a. The hydrogen that has been guided to the internal space 114 of the movable member 84a is supplied to the FC 20 through the second movable opening 112a (second fixed member 82a) and the pipe 54.

Therefore, the hydrogen (fluid) is guided from the movable member 84a to the second fixed member 82a without passing the inside of the motor 88a. Thus, the size of the motor 88a can be suppressed.

C. Third Embodiment

<C-1. Structure (Difference from First Embodiment)>

Figure 7A:
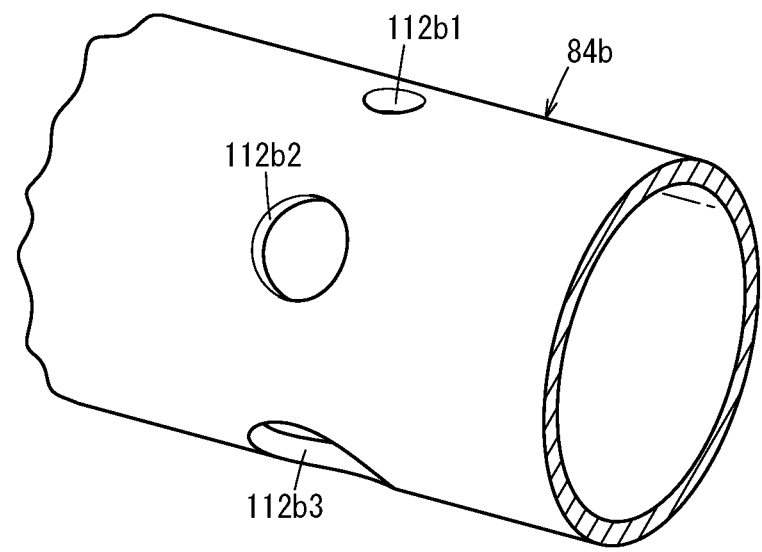
FIG. 7A is an external perspective view illustrating a part of a movable member in a third embodiment.
Figure 7B:
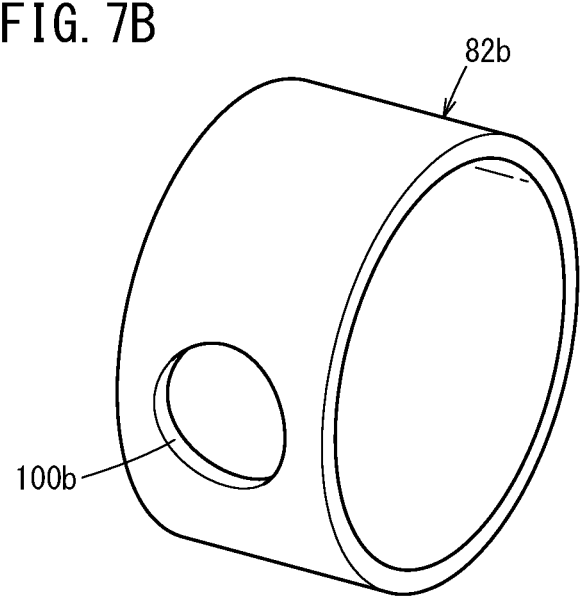
FIG. 7B is an external perspective view illustrating a second fixed member in the third embodiment.

FIG. 7A is an external perspective view illustrating part of a movable member 84b in a third embodiment. FIG. 7B is an external perspective view illustrating a second fixed member 82b in the third embodiment. FIG. 8 is a cross-sectional view in the third embodiment corresponding to FIG. 3 in the first embodiment. That is to say, FIG. 8 is the schematic cross-sectional view in which an injector 34b in the third embodiment is cut along a line corresponding to the line III-III in FIG. 2 in the first embodiment. A structure in the third embodiment is basically similar to that in the first embodiment. The same reference symbol hereinafter denotes similar components and detailed description thereof is omitted.

In the first embodiment, the movable member 84 includes one second movable opening 112 (FIG. 2 and FIG. 3). On the other hand, in the third embodiment, the movable member 84b includes three second movable openings 112b1, 112b2, 112b3.

As illustrated in FIG. 7A and FIG. 8, the second movable openings 112b1, 112b2, 112b3 have different opening areas A. Specifically, the opening area A of the opening 112b1 is the smallest and the opening area A of the opening 112b3 is the largest. In addition, the opening area A of the opening 112b3 is equal to that of an FC side opening 100b of the second fixed member 82b. When the opening 112b3 and the FC side opening 100b face each other (specifically, rotation phases coincide with each other), outlines thereof coincide with each other.

<C-2. Various Controls in Third Embodiment>

The FC output control and the injector motor control in the third embodiment are basically similar to those in the first embodiment. As described above, in the first embodiment, the movable member 84 includes one second movable opening 112 (FIG. 2 and FIG. 3). However, in the third embodiment, the movable member 84b includes the three second movable openings 112b1, 112b2, 112b3. In this point, the injector motor control in the third embodiment is different from that in the first embodiment.

In addition, in the third embodiment, the injector motor 88 needs to rotate in the normal and reverse directions. Thus, the injector 34b in the third embodiment includes a circuit (not shown) for reversing current to be supplied from the battery 28 to the motor 88 (for example, this circuit is a changeover switch).

In other words, in the injector motor control in the first embodiment, the movable member 84 is continuously rotated in one direction (FIG. 5). On the other hand, in the injector motor control in the third embodiment, the discharge flow F (flow rate) of the hydrogen gas is controlled by selecting any one of the three openings 112b1, 112b2, 112b3 and using the selected opening.

Figure 9:
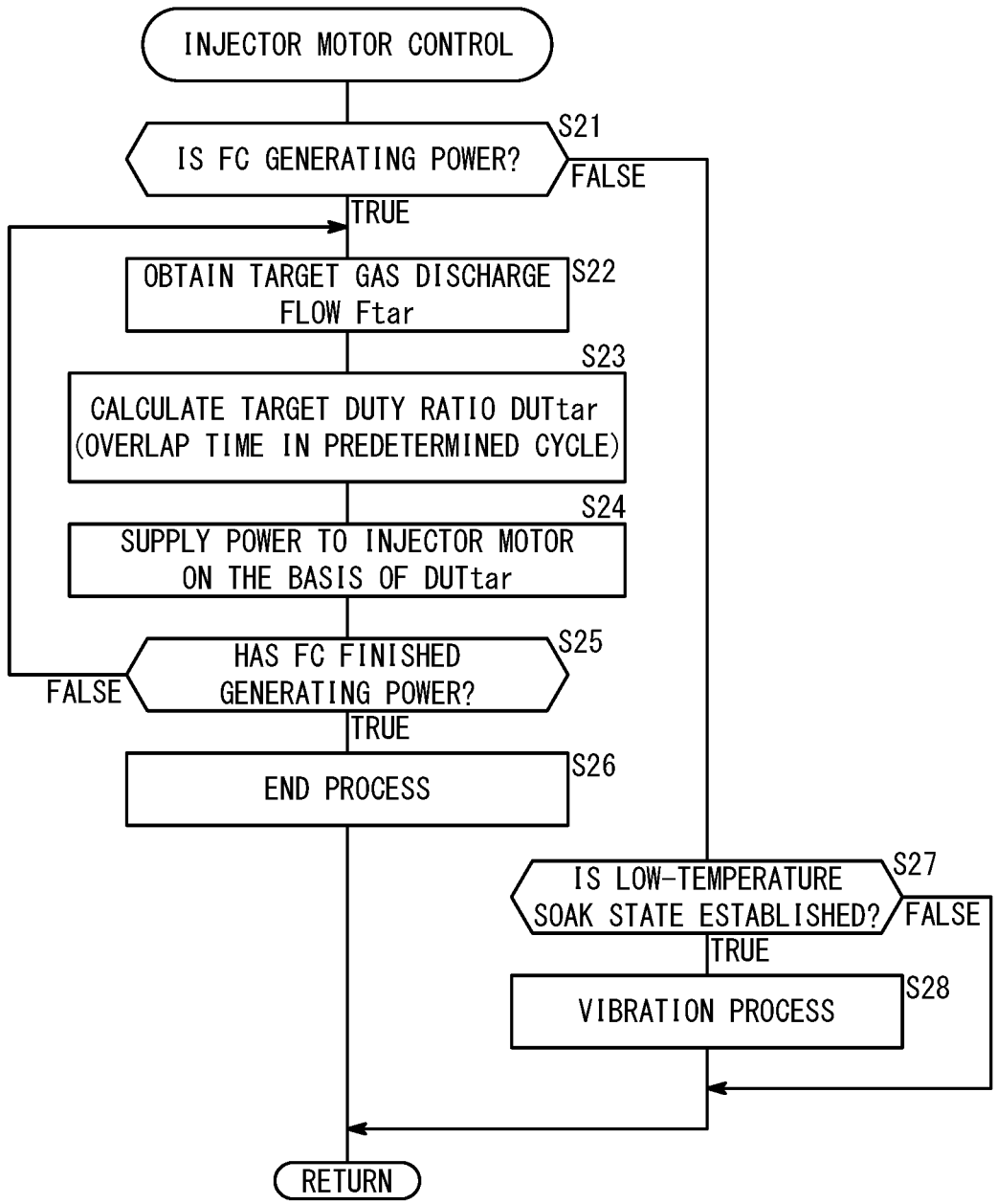
FIG. 9 is a flowchart of the injector motor control according to the third embodiment.

FIG. 9 is a flowchart of the injector motor control according to the third embodiment. Steps S21 and S22 in FIG. 9 are similar to steps S11 and S12 in FIG. 4.

In step S23, the injector controller 184 calculates a target duty ratio DUTtar on the basis of the target gas discharge flow Ftar. The target duty ratio DUTtar is an overlap time To for which the FC side opening 100b of the second fixed member 82b and any one of the three openings 112b1, 112b2, 112b3 of the movable member 84 overlap with each other in a predetermined cycle. The overlap time To corresponds to a time for which the FC side opening 100b and any one of the three openings 112b1, 112b2, 112b3 overlap with each other while the injector motor 88 is rotated in the normal and reverse directions.

Figure 10:
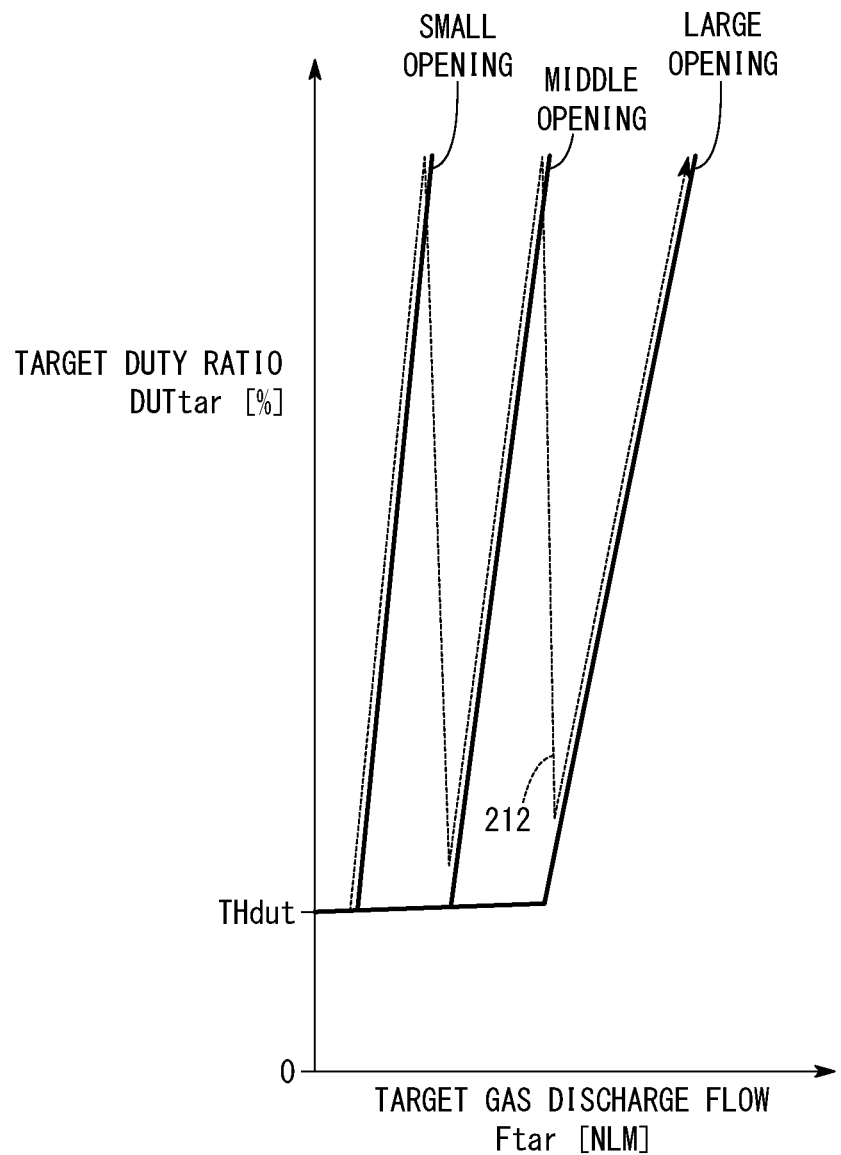
FIG. 10 shows a map that expresses a relation between the target gas discharge flow and a target duty ratio in the third embodiment.

FIG. 10 shows a map 210 that expresses a relation between the target gas discharge flow Ftar and the target duty ratio DUTtar in the third embodiment. As indicated by an arrow 212 in FIG. 10, when the target gas discharge flow Ftar is relatively small, the opening 112b1 with the smallest opening area A is selected. Then, as the target gas discharge flow Ftar increases, the target duty ratio DUTtar for the opening 112b1 is increased. When the target gas discharging flow Ftar becomes larger, the opening 112b2 with the middle-size opening area A is selected, and the duty ratio DUTtar is decreased for the moment.

Then, as the target gas discharge flow Ftar increases, the target duty ratio DUTtar for the opening 112b2 is increased. When the target gas discharging flow Ftar becomes larger, the opening 112b3 with the largest opening area A is selected, and the duty ratio DUTtar is decreased for the moment. As the target gas discharge flow Ftar increases, the target duty ratio DUTtar for the opening 112b3 is increased.

In FIG. 10, when the target duty ratio DUTtar is less than or equal to THdut, the target duty ratio DUTtar is constant at THdut. This is because, when the motor speed Vm becomes low so that the time for which the FC side opening 100 and the second movable opening 112 overlap with each other becomes extremely long, the hydrogen is discharged excessively; therefore, this motor speed Vm is not used as the target motor speed Vmtar. In this point, FIG. 10 is similar to FIG. 5. That is to say, by setting the target duty ratio DUTtar more than or equal to THdut, the motor speed Vm becomes more than or equal to Vm1.

In order not to use the motor speed Vm that is less than or equal to Vm1 as the target motor speed Vmtar, a run-up is performed at a place where the FC side opening 100b and the openings 112b1, 112b2, 112b3 overlap with each other. Thus, the openings 112b1, 112b2, 112b3 are disposed at predetermined distances (predetermined phase).

In step S24 in FIG. 9, the injector controller 184 supplies the power to the injector motor 88 on the basis of the target duty ratio DUTtar. As described above, the injector motor 88 is rotated in the normal and reverse directions in accordance with one target duty ratio DUTtar. Therefore, in the third embodiment, the storage unit 174 stores the map that holds power supply patterns (normal or reverse rotation, and power supply time) corresponding to the target duty ratio DUTtar. Then, the injector controller 184 reads out from the storage unit 174 and uses the power supply pattern corresponding to the target duty ratio DUTtar.

Steps S25, S26, S27, and S28 in FIG. 9 are similar to steps S16, S17, S18, and S19 in FIG. 4.

<C-3. Effect of Third Embodiment>

According to the third embodiment as described above, in addition to or instead of the effect of the first embodiment, the following effect can be obtained.

In the third embodiment, the movable member 84b includes the plurality of second movable openings 112b1, 112b2, 112b3 (movable opening) with different opening areas A (FIG. 7A and FIG. 8). Therefore, by selecting any one of the openings 112b1, 112b2, 112b3 in accordance with the requested flow rate, a wider flow rate adjustment range of the hydrogen (fluid) can be set.

In the third embodiment, the FC side opening 100b (fixed opening) of the second fixed member 82b has the opening area A that is equal to the largest opening area A of the openings 112b1, 112b2, 112b3 of the movable member 84b, and when both face each other, the outlines thereof coincide with each other (FIG. 7A, FIG. 7B, and FIG. 8). Therefore, when the FC side opening 100b and the largest opening 112b3 face each other, the hydrogen (fluid) can pass efficiently.

D. Fourth Embodiment

<D-1. Structure (Difference from First Embodiment)>

Figure 11:
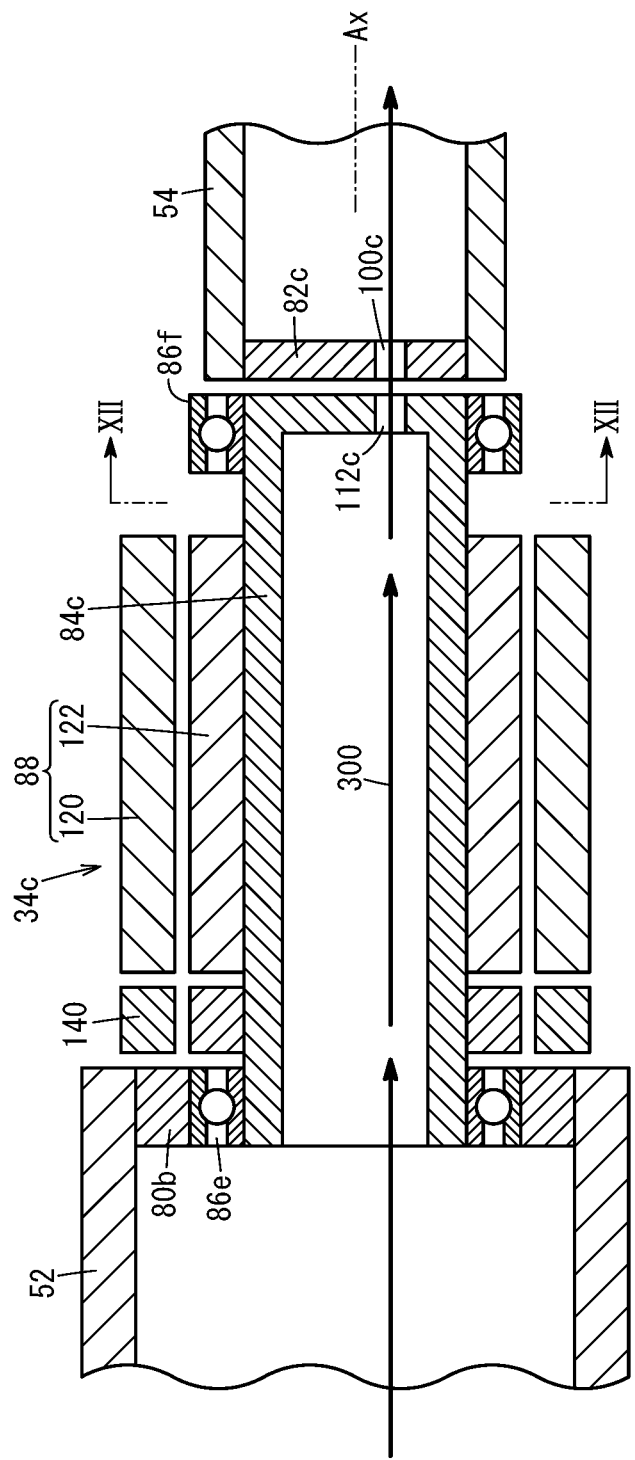
FIG. 11 illustrates a schematic structure of an injector according to a fourth embodiment.
Figure 12:
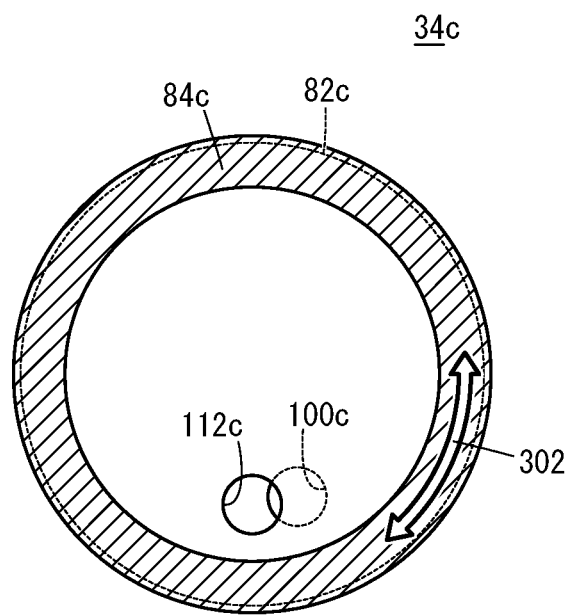
FIG. 12 is a schematic cross-sectional view taken along line XII-XII in FIG. 11.

FIG. 11 illustrates a schematic structure of an injector 34c according to a fourth embodiment. FIG. 12 is a schematic cross-sectional view taken along line XII-XII in FIG. 11. In FIG. 12, components other than a second fixed member 82c and a movable member 84c are omitted. A structure in the fourth embodiment is similar to that in the first embodiment basically. The same reference symbol hereinafter denotes similar components and detailed description thereof is omitted.

In the first and third embodiments, the FC side opening 100, 100b of the second fixed member 82, 82b is formed on the side surface of the second fixed member 82, 82b (FIG. 2, FIG. 3, FIG. 7A, FIG. 7B, and FIG. 8). Similarly, in the first and third embodiments, the second movable openings 112, 112b1, 112b2, 112b3 of the movable member 84, 84b are formed on the side surface of the movable member 84, 84b (FIG. 2, FIG. 3, FIG. 7A, FIG. 7B, and FIG. 8). On the other hand, in the fourth embodiment, an FC side opening 100c of the second fixed member 82c is formed on a bottom surface of the second fixed member 82c (FIG. 11 and FIG. 12). Similarly, in the fourth embodiment, a second movable opening 112c of the movable member 84c is formed on a bottom surface of the movable member 84c (FIG. 11 and FIG. 12).

The movable member 84c is rotatably supported by a bearing 86e fixed to a first fixed member 80b and a bearing 86f.

<D-2. Various Controls in Fourth Embodiment>

The FC output control and the injector motor control in the fourth embodiment are similar to those in the first embodiment.

<D-3. Effect of Fourth Embodiment>

In the fourth embodiment as described above, in addition to or instead of the effects of the first and third embodiments, the following effect can be obtained.

That is to say, in the fourth embodiment, the FC side opening 100c of the second fixed member 82c is formed on the bottom surface of the second fixed member 82c, and the second movable opening 112c of the movable member 84c is formed on the bottom surface of the movable member 84c (FIG. 11 and FIG. 12). Therefore, the direction of the rotation axis Ax (or longitudinal direction) of the movable member 84c and the second fixed member 82c, and an opening direction (in other words, the direction in which hydrogen is discharged) of the second movable opening 112c and the FC side opening 100c can coincide with each other. Thus, compared with the first embodiment, a pressure loss at the FC side opening 100c and the second movable opening 112c can be suppressed.

E. Fifth Embodiment

<E-1. Structure (Difference from First to Fourth Embodiments)>

Figure 13:
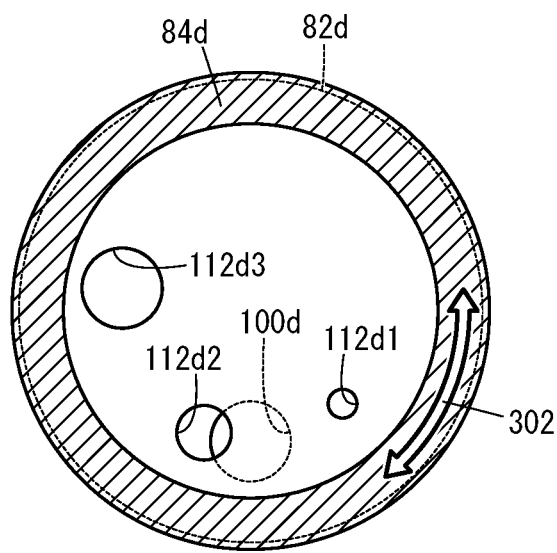
FIG. 13 is a cross-sectional view in a fifth embodiment corresponding to FIG. 12 in the fourth embodiment.

FIG. 13 is a cross-sectional view in the fifth embodiment corresponding to FIG. 12 in the fourth embodiment. That is to say, FIG. 13 is the schematic cross-sectional view in which an injector 34d in the fifth embodiment is cut along a line corresponding to the line XII-XII in FIG. 11 in the fourth embodiment. A structure in the fifth embodiment is basically similar to that in the first to fourth embodiments. The same reference symbol hereinafter denotes similar components and detailed description thereof is omitted.

In the fifth embodiment, similarly to the third embodiment, a movable member 84*d* includes three second movable openings 112*d*1, 112*d*2, 112*d*3.

In the fifth embodiment, similarly to the fourth embodiment, an FC side opening 100*d* of a second fixed member 82*d* is formed on a bottom surface of the second fixed member 82*d*, and the second movable openings 112*d*1, 112*d*2, 112*d*3 of the movable member 84*d* are formed on a bottom surface of the movable member 84*d* (FIG. 13).

As illustrated in FIG. 13, a relation between the opening areas A of the openings 112*d*1, 112*d*2, 112*d*3 is similar to that in the third embodiment. That is to say, the openings 112*d*1, 112*d*2, 112*d*3 have different opening areas A. Specifically, the opening area A of the opening 112*d*1 is the smallest and the opening area A of the opening 112*d*3 is the largest. In addition, the opening area A of the opening 112*d*3 is equal to that of the FC side opening 100*d* of the second fixed member 82*d*. When the opening 112*d*3 and the FC side opening 100*d* face each other (specifically, rotation phases coincide with each other), outlines thereof coincide with each other.

<E-2. Various Controls in Fifth Embodiment>

The FC output control and the injector motor control in the fifth embodiment are similar to those in the third embodiment.

<E-3. Effect of Fifth Embodiment>

In the fifth embodiment as described above, in addition to or instead of the effects of the first to fourth embodiments, the following effect can be obtained. That is to say, in the fifth embodiment, the effects of the third embodiment and the fifth embodiment can be obtained at the same time.

F. Sixth Embodiment

<F-1. Structure (Difference from First to Fifth Embodiments)>

Figure 14:
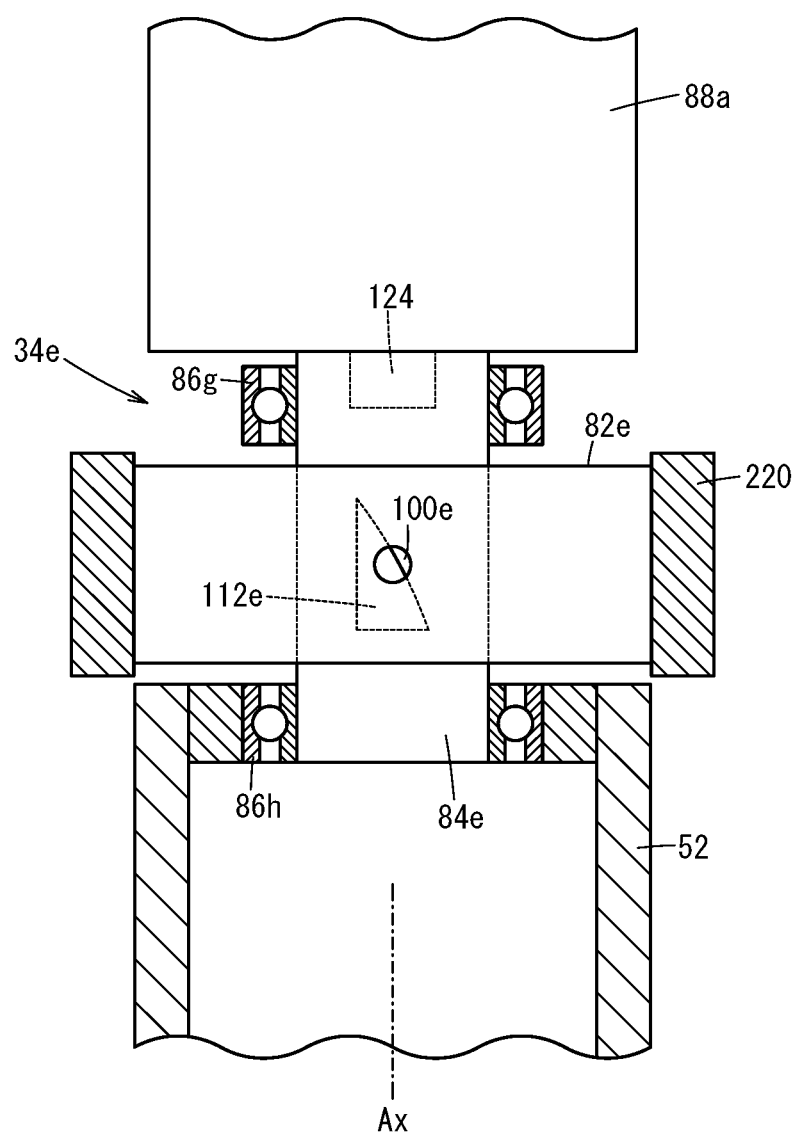
FIG. 14 illustrates a schematic structure of an injector according to a sixth embodiment.

FIG. 14 illustrates a schematic structure of an injector 34*e* according to a sixth embodiment. A structure in the sixth embodiment is basically similar to that in the first to fifth embodiments. The same reference symbol hereinafter denotes similar components and detailed description thereof is omitted.

In the first embodiment, both the FC side opening 100 of the second fixed member 82 and the second movable opening 112 of the movable member 84 have a circular shape (FIG. 2 and FIG. 3). In this point, the second to fifth embodiments are similar to the first embodiment (FIG. 6 to FIG. 8, FIG. 11 to FIG. 13). On the other hand, in the sixth embodiment, an FC side opening 100*e* of a second fixed member 82*e* has a circular shape; however, a second movable opening 112*e* of a movable member 84*e* has a triangular shape (a shape of triangle) (FIG. 14).

The injector 34*e* according to the sixth embodiment includes bearings 86*g*, 86*h*, and a displacement mechanism 220. The bearings 86*g*, 86*h* support the movable member 84*e* rotatably. The displacement mechanism 220 includes, for example, a linear actuator that is not shown, and displaces the second fixed member 82*e* in the axial direction (or longitudinal direction).

The displacement mechanism 220 displaces the second fixed member 82*e* in the direction of the rotation axis Ax (or longitudinal direction) so that the FC side opening 100*e* is displaced in the direction of the rotation axis Ax. More specifically, the FC side opening 100*e* can be displaced in a direction of the base length of the triangle of the second movable opening 112*e* and in a direction of the height of the triangle. Thus, when the movable member 84*e* is rotated, the overlap area Ao or the overlap frequency Fo between the FC side opening 100*e* and the second movable opening 112*e* can be adjusted.

<F-2. Various Controls in Sixth Embodiment>

The FC output control and the injector motor control in the sixth embodiment are basically similar to those in the first to fifth embodiments. However, as described above, in the sixth embodiment, the second movable opening 112*e* of the movable member 84*e* has a triangular shape (FIG. 14). In addition, in the sixth embodiment, the displacement mechanism 220 is provided. Because of these differences, the injector motor control in the sixth embodiment is different from that in the first to fifth embodiments.

Figure 15:
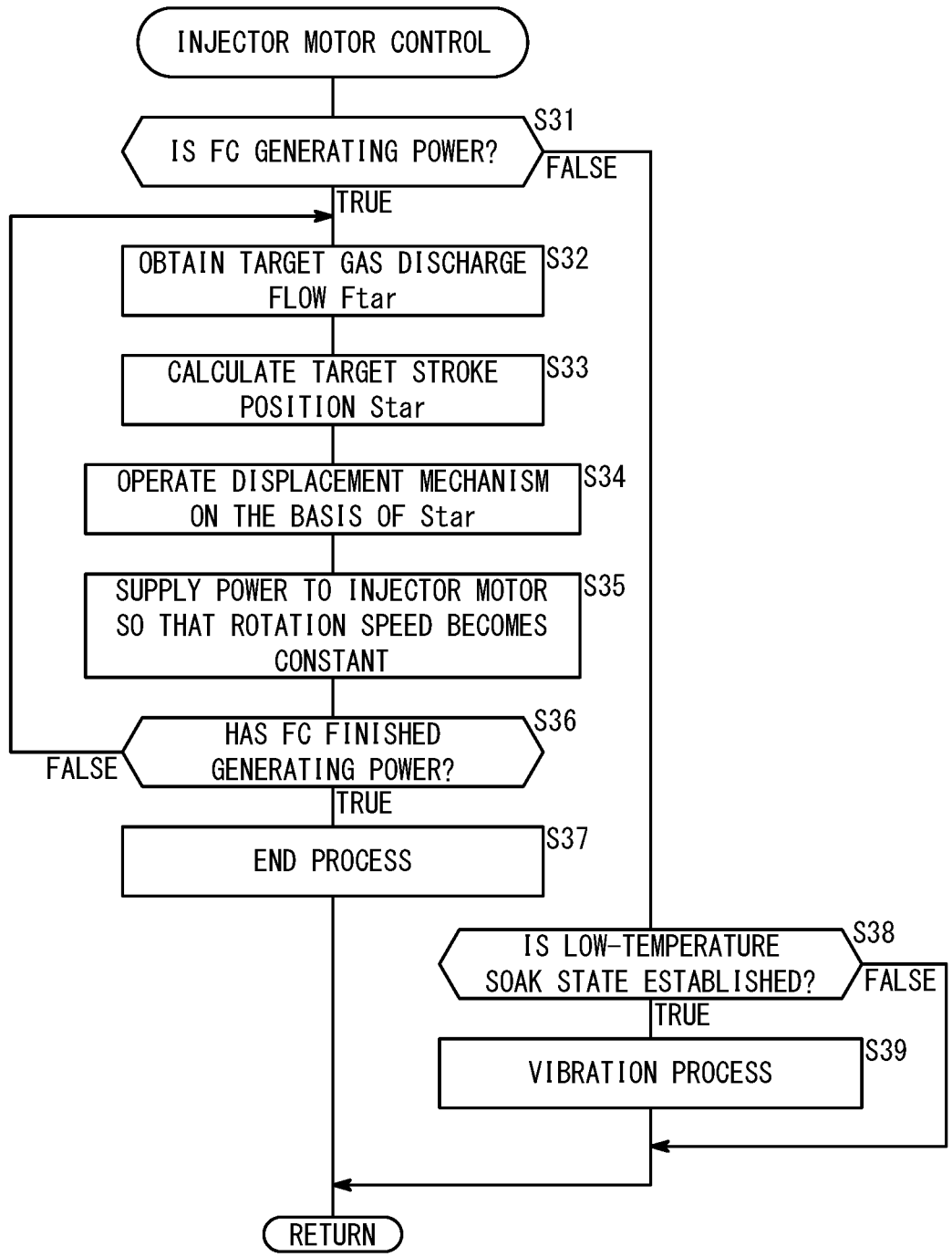
FIG. 15 is a flowchart of the injector motor control in the sixth embodiment.

FIG. 15 is a flowchart of the injector motor control in the sixth embodiment. Steps S31 and S32 in FIG. 15 are similar to steps S11 and S12 in FIG. 4 and steps S21 and S22 in FIG. 9.

In step S33, the injector controller 184 of the ECU 152 calculates a target stroke position Star on the basis of the target gas discharge flow Ftar. The target stroke position Star is a position of the second fixed member 82*e* in the direction of the rotation axis Ax (or longitudinal direction) of the second fixed member 82*e*. As the target stroke position Star becomes larger, the FC side opening 100*e* of the second fixed member 82*e* comes close to the base of the second movable opening 112*e*.

Figure 16:
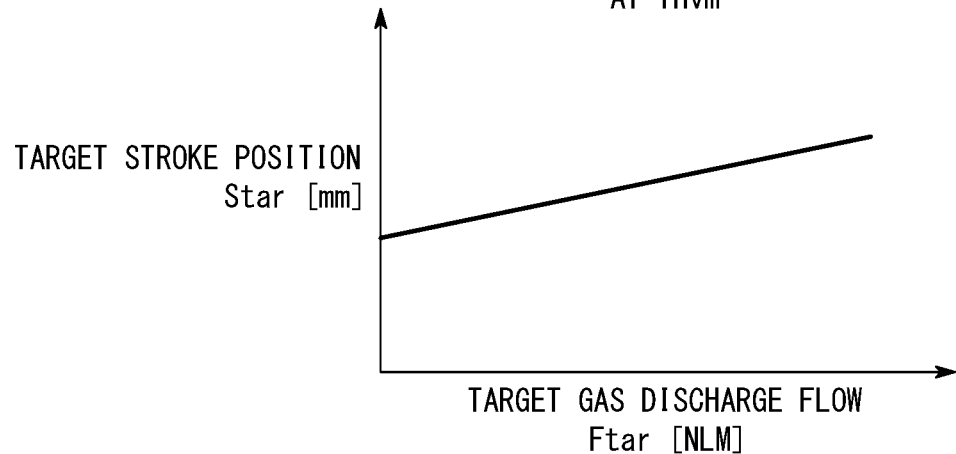
FIG. 16 shows a map that expresses a relation between the target gas discharge flow and a target stroke position in the sixth embodiment.

FIG. 16 shows a map 230 that expresses a relation between the target gas discharge flow Ftar and the target stroke position Star in the sixth embodiment. As shown in FIG. 16, basically, as the target gas discharge flow Ftar becomes larger, the target stroke position Star is increased. As described above, as the target stroke position Star becomes larger, the FC side opening 100*e* of the second fixed member 82*e* comes close to the base of the second movable opening 112*e*. Therefore, if the rotation speed Vm of the motor 88*a* is constant, as the target stroke position Star becomes larger, a time for which the FC side opening 100*e* and the second movable opening 112*e* overlap with each other (or overlap area Ao or overlap frequency Fo) increases.

In step S34 in FIG. 15, the injector controller 184 operates the displacement mechanism 220 on the basis of the target stroke position Star so that an actual stroke position S becomes equal to the target stroke position Star. In step S35, the injector controller 184 supplies the power to the injector motor 88*a* so that the rotation speed Vm of the motor 88*a* becomes constant at THvm (>Vm1).

Steps S36, S37, S38, and S39 in FIG. 15 are similar to steps S16, S17, S18, and S19 in FIG. 4, and steps S25, S26, S27, and S28 in FIG. 9.

<F-3. Effect of Sixth Embodiment>

In the sixth embodiment as described above, in addition to or instead of the effects of the first to fifth embodiments, the following effect can be obtained.

That is to say, in the sixth embodiment, the second movable opening 112*e* (movable opening) has the triangular shape (FIG. 14). In addition, the FC side opening 100*e* (fixed opening) can be displaced in the direction of the base length of the triangle and in the direction of the height of the triangle (FIG. 14 and FIG. 15).

Therefore, the FC side opening 100*e* to be displaced in the direction of the base length is displaced in the direction of the height of the triangle in accordance with the target gas discharge flow Ftar (requested flow rate) so that the flow rate of the hydrogen (fluid) can be adjusted. Thus, without increasing the number of the components excessively, a wider flow rate adjustment range can be set.

G. Modifications

Note that the present invention is not limited to the above embodiments and can employ various structures on the basis of the description of the present specification. For example, the following structures can be employed.

<G-1. Application Object>

In the first embodiment, it is assumed that the power generated by the FC system 10 is supplied to a fuel cell vehicle (FCV). However, for example, from the viewpoint of variably adjusting the overlap area Ao or the overlap frequency Fo between the FC side opening 100 (fixed opening) and the second movable opening 112 (movable opening) by relatively displacing the movable surface 132 along the fixed surface 130, the present invention is not limited to this example. In another example, the power generated by the FC system 10 may be supplied to a house or the like. This point similarly applies to the second to sixth embodiments.

In the first embodiment, the injector 34 (flow rate adjustment structure) is used for discharging the hydrogen (FIG. 1). However, for example, from the viewpoint of variably adjusting the overlap area Ao or the overlap frequency Fo between the FC side opening 100 (fixed opening) and the second movable opening 112 (movable opening) by relatively displacing the movable surface 132 along the fixed surface 130, the present invention is not limited to this example. For example, the injector 34 may be used for other purposes. This point similarly applies to the second to sixth embodiments.

<G-2. Injector 34, 34*a* to 34*e*>

In the first embodiment, the first fixed member 80, the second fixed member 82, and the movable member 84 have a cylindrical shape (FIG. 2, FIG. 3). However, for example, from the viewpoint of variably adjusting the overlap area Ao or the overlap frequency Fo between the FC side opening 100 (fixed opening) and the second movable opening 112 (movable opening) by relatively displacing the movable surface 132 along the fixed surface 130, the present invention is not limited to this example. In another example, the second fixed member 82 and the movable member 84 may have a square-prism shape. In this example, the overlap area Ao or the overlap frequency Fo may be adjusted variably by sliding (without rotating) the movable member 84 relative to the second fixed member 82 in the state where the side surfaces thereof are in contact or nearly in contact with each other. This point similarly applies to the second to sixth embodiments.

In the third embodiment, the largest opening 112*b*3 among the second movable openings 112*b*1, 112*b*2, 112*b*3 has the opening area A that is equal to the opening area A of the FC side opening 100*b* (FIG. 7A, FIG. 7B, and FIG. 8). However, for example, from the viewpoint of variably adjusting the overlap area Ao or the overlap frequency Fo between the FC side opening 100*b* (fixed opening) and the second movable openings 112*b*1, 112*b*2, 112*b*3 (movable opening) by relatively displacing the movable surface 132 along the fixed surface 130, the present invention is not limited to this example. In another example, the largest opening 112*b*3 may have the opening area A that is either larger or smaller than the opening area A of the FC side opening 100B. This point similarly applies to the fifth embodiment.

In the third embodiment, the three second movable openings 112*b*1, 112*b*2, 112*b*3 are provided (FIG. 7 and FIG. 8). However, for example, from the viewpoint of providing the plurality of openings, the present invention is not limited to this example. The number of openings may be two or four or more. This point similarly applies to the fifth embodiment.

In the third embodiment, the second movable openings 112*b*1, 112*b*2, 112*b*3 have different opening areas A (FIG. 7A and FIG. 8). However, for example, from the viewpoint of providing the plurality of openings, the present invention is not limited to this example. The opening areas A may be the same. This point similarly applies to the fifth embodiment.

<G-3. Control of ECU 152>

In the above embodiments, when numbers are compared, an equal sign is contained in one case and not in another case. However, for example, if there is no special reason to use or not to use the equal sign (in other words, as long as effect of the present invention can be obtained), whether to use the equal sign in comparing the numbers can be set arbitrarily.

The first embodiment is performed in accordance with the flowchart in FIG. 4. However, for example, the contents of the flowcharts (order of steps) are not limited to those above, as long as the effect of the present invention can be obtained. For example, in FIG. 4, step S14 may come before step S13.

What is claimed is:

1. A flow rate adjustment structure configured to adjust a flow rate of a fluid, comprising:
    a fixed member including a fixed surface on which a fixed opening is formed;
    a movable member including a movable surface on which a movable opening is formed, and to be displaced relative to the fixed member;
    a motor configured to variably adjust an overlap area or an overlap frequency between the fixed opening and the movable opening by relatively displacing the movable surface along the fixed surface;
    a first bearing provided at one end of the movable member and rotatably supporting the movable member;
    a second bearing provided at another end of the movable member and rotatably supporting the movable member,
    wherein the motor is positioned between the first bearing and the second bearing.

2. The flow rate adjustment structure according to claim 1, wherein the movable member is configured to rotate relative to the fixed member.

3. The flow rate adjustment structure according to claim 2, wherein: the fixed member and the movable member have a concentric cylindrical shape; and the motor is configured to vary the overlap area or the overlap frequency between the fixed opening and the movable opening by rotating the movable member.

4. The flow rate adjustment structure according to claim 3, wherein the motor is configured to vary the overlap area or the overlap frequency between the fixed opening and the movable opening by continuously rotating the movable member in one direction.

5. The flow rate adjustment structure according to claim 1, wherein one of the fixed opening and the movable opening comprises a plurality of openings with different opening areas.

6. The flow rate adjustment structure according to claim 5, wherein the other of the fixed opening and the movable opening has an opening area that is equal to the largest opening area of the plurality of openings, and when both face each other, outlines thereof coincide with each other.

7. The flow rate adjustment structure according to claim 1, wherein: one of the fixed opening and the movable opening has a shape of a triangle; and the other can be displaced in a direction of a base length of the triangle and in a direction of a height of the triangle.

8. A flow rate adjustment structure configured to adjust a flow rate of a fluid, comprising:
- a fixed member including a fixed surface on which a fixed opening is formed;
- a moveable member including a movable surface on which a movable opening is formed, and to be displaced relative to the fixed member;
- a motor configured to variably adjust an overlap area or an overlap frequency between the fixed opening and the moveable opening by relatively displacing the movable surface along the fixed surface; and
- a controller configured to determine, after the movable member is stopped, whether an index temperature regarding an outside air temperature or a peripheral temperature of the movable member becomes less than or equal to a temperature threshold that is equal to or near zero degrees Celsius,
- wherein if it is determined that the index temperature becomes less than or equal to the temperature threshold, the controller is configured to vibrate or reciprocate the movable member through the motor in a state where the fixed opening and the movable opening are relatively displaced so that the fixed opening and the movable opening do not overlap with each other.

9. A flow rate adjustment method for adjusting a flow rate of a fluid, comprising:
- disposing a fixed member that includes a fixed surface on which a fixed opening is formed, and a movable member that includes a movable surface on which a movable opening is formed and is displaced relative to the fixed member, so that the fixed member and the movable member face each other, a first bearing being provided at one end of the moveable member and rotatably supporting the moveable member, a second bearing being provided at another end of the moveable member and rotatably supporting the moveable member;
- adjusting variably an overlap area or an overlap frequency between the fixed opening and the movable opening by relatively displacing the movable surface along the fixed surface, by a motor positioned between the first bearing and the second bearing,
- wherein the movable member is continuously rotated in one direction, and the overlap frequency is variable depending on rotating speed of the movable member.

* * * * *